Sept. 18, 1934. C. M. FRANCIS 1,973,978
RECIRCULATION CONTROL FOR KILNS AND FURNACES
Filed July 10, 1933 4 Sheets-Sheet 1

Inventor
Chester M. Francis
By Thorpe & Thorpe
Attorneys

Sept. 18, 1934.    C. M. FRANCIS    1,973,978
RECIRCULATION CONTROL FOR KILNS AND FURNACES
Filed July 10, 1933    4 Sheets-Sheet 2
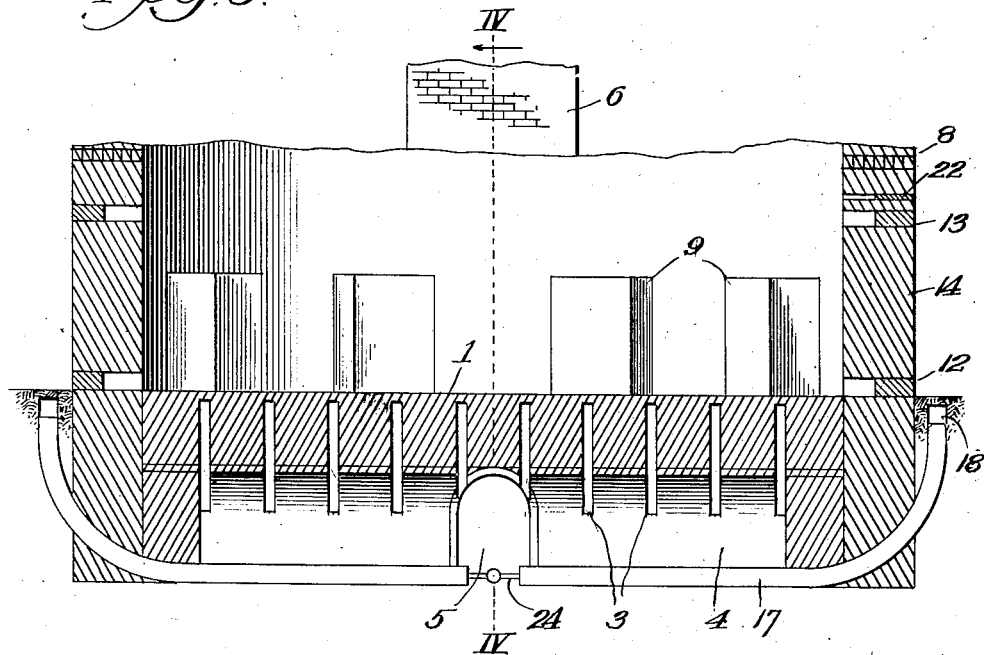
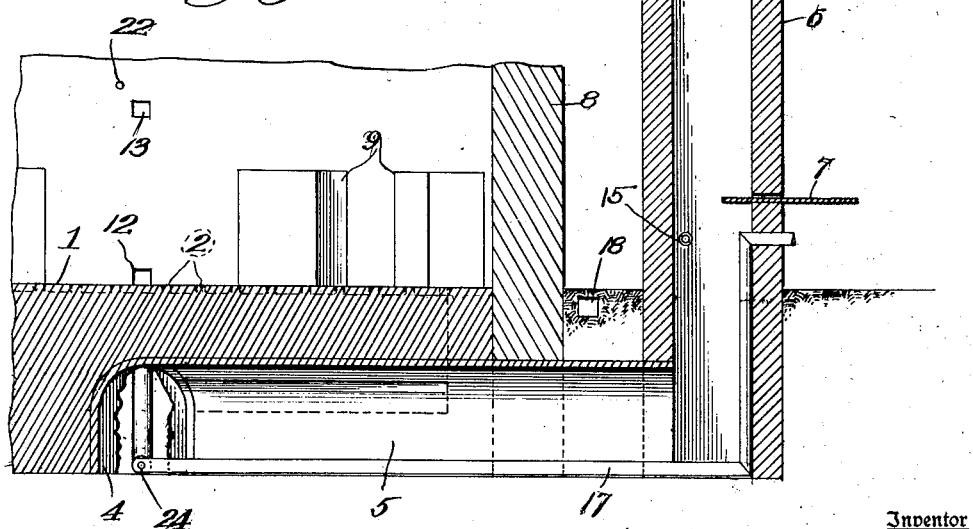
Inventor
Chester M. Francis
By Thorpe & Thorpe
Attorneys Sept. 18, 1934.  C. M. FRANCIS  1,973,978
RECIRCULATION CONTROL FOR KILNS AND FURNACES
Filed July 10, 1933  4 Sheets-Sheet 3

Inventor
Chester M. Francis
By Thorpe&Thorpe
Attorneys

Sept. 18, 1934.   C. M. FRANCIS   1,973,978
RECIRCULATION CONTROL FOR KILNS AND FURNACES
Filed July 10, 1933   4 Sheets-Sheet 4

Inventor
Chester M. Francis,
By Thorpe & Thorpe
Attorneys

Patented Sept. 18, 1934

1,973,978

UNITED STATES PATENT OFFICE 1,973,978

RECIRCULATION CONTROL FOR KILNS AND FURNACES

Chester M. Francis, Lees Summit, Mo.

Application July 10, 1933, Serial No. 679,646

13 Claims. (Cl. 25—135)

This invention relates to fuel conservation by recirculation control for kilns, rotary kilns, furnaces and other combustion units, and has for one of its objects to provide a process of and a means for recirculating, under forced draft, a part of the gases or products of combustion, through the combustion zone or furnace chamber to recapture a percentage of the heat which would otherwise escape through the stack or vent.

A further object of the invention is to provide a process of and apparatus for effecting a quicker, more uniform and better controlled system for the burning or firing of ceramics, clay products, cement and other heat treated substances, whereby the heat of the kiln is more evenly distributed throughout the ware and there is a smaller percentage of rejects, a more uniform firing, and a material saving in time and fuel expenditures.

The process and apparatus will be described more particularly as related to clay products, where there are four general stages or steps to which the contents of the kiln are subjected, as follows:—

1. Water smoking. This comprises the removal of free water or moisture by the gradual heating of the kiln.

2. Relief of chemical waters. These waters are in chemical or mechanical union with the clays or elements of the ware. The relief of these waters usually does not occur until the kiln reaches temperatures of approximately 800 to 900 degrees Fahrenheit. Oxygen is essential to this operation.

3. Oxidation of the ware. This step involves the elimination of volatile matters and the oxidation of some of the elements of the ware, for example, the ferrous irons are converted to ferric irons. The temperature at which this occurs is from 1000 to 1500 degrees Fahrenheit in the usual circumstances. Oxygen is essential to this operation.

4. The reducing, soaking, vitrification or fluxing state. The temperature at which this usually occurs is from 1500 to 2100 degrees Fahrenheit. Oxygen in excess is not essential during this stage.

The prior art, as shown by patent to William H. Francis, No. 972,524, granted October 11, 1910, contemplated the recirculation of the products of combustion through a kiln, but the process recited in said patent proved to be unsuccessful although much time and effort were expended in an endeavor to reduce it to practice. No effort was ever made to apply the process to other than the fourth stage of clay products burning, but the flashing of the ware could not be prevented, probably on account of insufficient control or lack of secondary air. A further objection to the disclosure of said patent lies in the fact that it contemplates the use of steam for the jetting or pumping of the flue gases. I have attempted to use steam for recirculation of flue gases and find that it cannot be done, as upon the admission of steam or any other substance foreign to the products of combustion, to effect circulation, a static condition results in the furnace and that the damper controlling the escape of gases through the stack or vent must be opened to allow for the increase in volume of circulating medium, which results in a waste of heat. If the damper is not opened to accommodate the flow of the increased volume due to the admission of foreign materials, even of air, there is a stagnation in the circulation and the heat is localized to a point adjacent the burning point.

Generally speaking the disclosure of said patent, as it relates to apparatus necessary to carry it into practice is incomplete. For example, the patent shows no control of the vent by adjustable means and from the patent it is impossible to determine whether or not the kiln "eye" at 6, in Figure 1, is open or closed. If the eye is open, there will be no gain over standard practice as the volume of air will create a static condition and will build a back pressure resisting flow of the flue gases.

As a matter of fact, in actual experimental use, the inventor, William H. Francis, had the eyes of the kiln of Figure 1, tightly closed, with the result that the apparatus appeared as shown in Figure 3. The apparatus as shown in said figure is completely inoperable in stages 2 and 3 of the burning of clay products. As applied to stage 4, it was discovered that the quantity of flashed or improperly burned ware, soon resulted in a greater loss than any gain in the saving of fuel.

In general, I have found that the process, as will hereinafter more particularly appear, must involve the damper control of the stack or vent and for best efficiency must be adjusted to each particular furnace or kiln, due to differences in the tightness of the units as it affects radiation, and furthermore, that the process as regards temperatures, volumes of recirculation and volumes of secondary air, must vary in accordance with the nature of the mix or the type of products being burned. In actual practice, kiln temperatures and $CO^2$ content of the flue gases are recorded, and the peep holes of the kiln and the openings in the wickets are used for visual inspection of the glow or heat of the ware within the kiln, the object being to attain as perfect combustion as possible throughout the furnace and to distribute the heat as evenly as possible throughout the ware, admitting outside or secondary air only to the extent necessary to support combustion and for uniting with the elements of the ware to change their chemical nature and to burn those which are inflammable. The degree of fulfillment of these conditions can be determined by visual inspection through the usual kiln peep holes and wicket openings, and in practice, even the uninitiated can visually note the even heat distribution in kilns operated by the process of this invention, as compared to standard kilns.

After these variables have been once determined for a kiln and a particular mix and type of ware, the valves or means controlling the fuel volume or feed of coal, or the like, the damper settings, the volume of recirculated gases, and the volume of secondary air, may be set accordingly upon the reburning or refiring of similar kiln charges, with assurance that similar results, other things remaining the same, will be secured as regards saving of fuel and time and the evenness of the heat throughout the kiln.

With the general objects named in view and others as will hereinafter appear, reference is to be had to the accompanying drawings, as indicating what I now believe to be the preferred form of apparatus as applied to a down draft clay products kiln and as applied to a boiler furnace, it being understood however that the process may be applied to any type of furnace, kiln or other structure for the burning of fuel.

In the drawings:

Figure 3 is an enlarged central vertical cross section of the lower part of the kiln, the upper part of the same being omitted to show the chimney or stack in the center of the background.

Figure 4 is a fragmental vertical section of the lower part of the kiln and also the lower part of the stack connected thereto, the section being taken on the line IV—IV of Figure 3.

Figure 1:
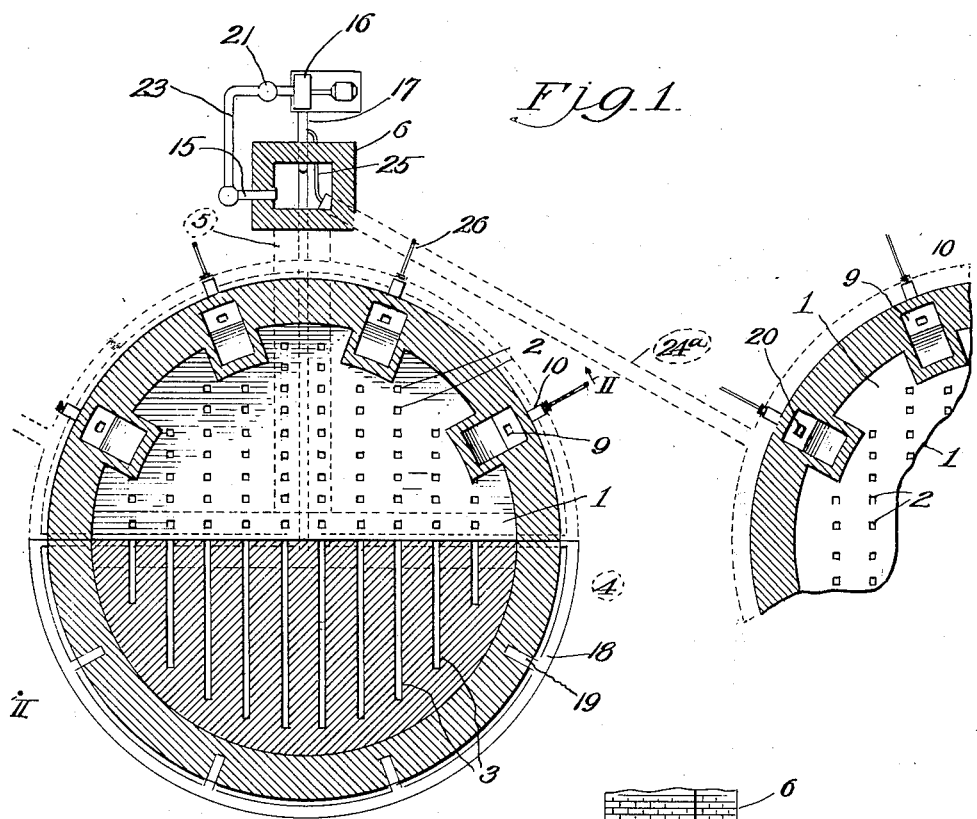
Figure 1 is a view depicting a kiln embodying the invention and a part of a second kiln in cooperative relationship therewith, the upper half of the figures representing the kiln in horizontal section through the "eyes" and the other half in horizontal section on the line I—I of Figure 2.
Figure 2:
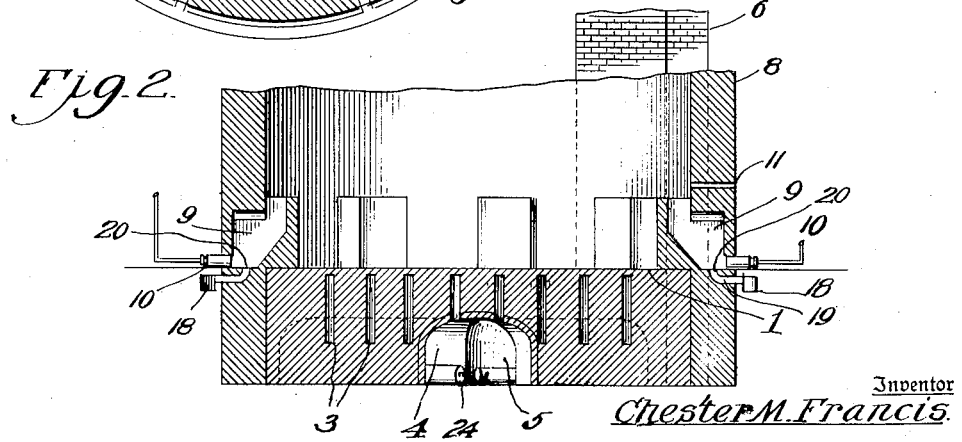
Figure 2 is a fragmental vertical section on the line II—II of Figure 1.
Figure 5:
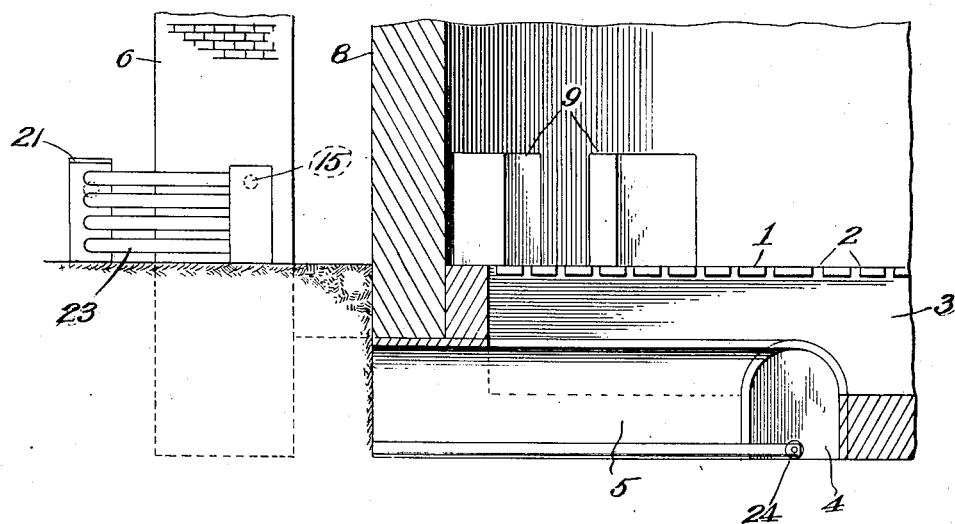
Figure 5 is a section through a part of the kiln to indicate the position of a certain radiator forming a part of the invention.
Figure 6:
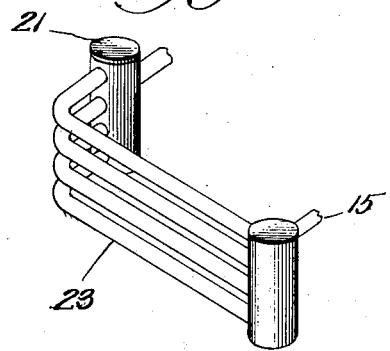
Figure 6 is a perspective view of a type of radiator.

In the said drawings, where like reference characters identify corresponding parts in all of the figures, 1 indicates the floor of a downdraft kiln having the usual openings 2 communicating with the circulation slots 3. The ends of the slots open into a transverse tunnel 4. Centrally of the kiln the main tunnel 5 connects with the tunnel 4, the other end of the tunnel 5 being connected to the stack 6 or to any other exhaust passageway, and is provided with a manually controlled damper 7. For convenience of illustration, a bee-hive kiln is shown, the walls 8 thereof being provided with a number of eyes or combustion chambers 9, where any type of fuel is burned, gas burners 10 being indicated in the present case. The kiln is provided throughout its perimeter with the usual peep holes 11, and also has the customary plugged wicket openings 12 and 13 in the usual wickets 14. The wicket openings 12 and 13 are respectively adjacent the floor level and some distance above the ground level, and are placed in alinement in the wickets on opposite sides of the kiln so that, if desired an inspection of the ware entirely through the kiln, may be made. The wicket openings and the peep holes are used for inspection of the ware and the condition of combustion in the kiln.

The apparatus essential to the practice of the invention on the type of kiln illustrated herein comprises a passageway or tube 15 having one end opening into the stack 6 for the withdrawal of the products of combustion and having its other end connected to the intake of a fan or blower 16. The discharge of the fan or blower 16 is connected to a tube 17, which in turn is connected to a header 18, provided with branch pipes 19 for discharging at 20 into each eye or combustion chamber 9 of the kiln. As the proper operation of the kiln requires the admission of secondary air, the duct 15 between its connection to the stack 6 and to the fan 16 is provided with a manually controlled valve or air intake damper 21.

The volume of flue gases is controlled through regulation of the fan or blower 16 and the setting of the air and flue dampers 21 and 7, according to conditions within the kiln. Also mounted in the wickets 14 is an inspection tube 22 through which the vacuous condition in the kiln may be tested. The distance of the tube from the floor of the kiln is in accordance with the ultimate temperature required for the particular kiln charge. The higher the ultimate temperature the higher the position of the tube from the floor. The proper position for this tube will vary from kiln to kiln and its position is determined by cut and try methods for each kiln as it will vary in accordance with radiation losses in the kilns. As a practical matter variation of the position of the tube within reasonable limits does not make a great difference in results, as its position is limited to the height of the wicket, in any event. On one kiln installation it was found the tube should be about 5 feet above floor level in firing a charge requiring about 1800 degrees Fahrenheit.

In actual practice, no fan was available which would handle the entire volume of gases to be recirculated at their exhaust temperatures and in the absence of such a fan or blower, it may be found necessary to cool the flue gases as by a radiatory 23 inserted in the duct 15, before they enter the fan. Furthermore, it is unnecessary to provide a fan or blower of such size as to directly handle and recirculate the large volume of flue gases essential for best economy, so a blower may be used which has a relatively high velocity making it possible to insert jets 24 in the duct 17 at the center of the tunnels 4 and 5 to entrain a proportion of the exhausting flue gases before they reach the stack.

In Figure 1, a branch duct 24a is shown connected to an adjacent kiln. This duct opens into the stack 6 and is provided with a jet pipe 25 from the duct 17 whereby it is possible to employ a proportion of the gases which would otherwise be exhausted from the stack to assist in the initial firing of an adjacent kiln. The duct 24 is controlled by a damper 26 which is ordinarily closed.

In practice it will be noted that the better the ducts and pipes are insulated the more efficient the system, and it is for this reason that the return duct 17 is preferably run back through the exhaust passageway of the kiln so that it may act as a heat exchanger to insure that the gases delivered at the kiln eyes shall be as hot as possible, as the higher the heat the greater the saving.

Kiln operation

In the operation of the process as applied to kilns, when the fires are first started and during the water smoking or first stage of the burning of clay products, the return circulation is not employed as the object at this time is to get the greatest circulation possible, the stack damper and the kiln eyes being wide open. If there is insufficient circulation at this time through the stack or chimney, the atmosphere at the top of the kiln will be found to be saturated with moisture and at the bottom of the kiln the dew point may be attained resulting in condensation on the ware with a more or less melting thereof.

After the driving off of this moisture the eyes of the kiln are tightly closed which has the effect of creating a vacuous condition inside the kiln. The operator will now start to close the stack damper until tests at the pipe or tube 22 show a static condition in the kiln. Vacuous and pressure conditions within the kiln are respectively indicated by a sucking in and puffing out of air through the tube. The damper adjustment will continue until a slight vacuous condition is attained in the kiln.

The recirculation apparatus is now set in operation and the operator will commence to open the air damper until the $CO^2$ tester indicates that the kiln is receiving sufficient secondary oxygen. After all of the carbons and volatile matters of stages 2 and 3 have left the ware, it will be found that the $CO^2$ tester will show from 9% to 10% $CO^2$ (indicating approximately only 18% to 20% excess air), and when this condition has been reached, more air is no longer necessary or desirable.

The final stage of burning clay products is merely a matter of time and temperature and the operator now proceeds to cut down slightly on the fuel, regulating the burner to maintain the temperature against radiation and other losses, and also decreases the amount of secondary air by partially closing the air damper, watching his $CO^2$ percentage to avoid interfering with proper combustion. The decrease in the fuel and in the volume of secondary air admitted reduce the necessity for a large escape through the stack, so that the operator now proceeds to close the stack damper until an approximately static condition is reached in the kiln as shown by the test heretofore described. The combustion rate is now controlled to maintain the desired kiln temperature against radiation losses and the like, it being possible to hold the desired heat with less fuel than under standard practices.

Figure 7:
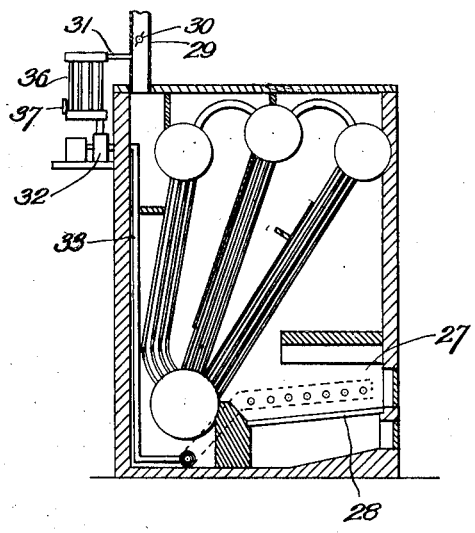
Figure 7 is a section through a boiler furnace showing the apparatus of the invention applied thereto.
Figure 8:
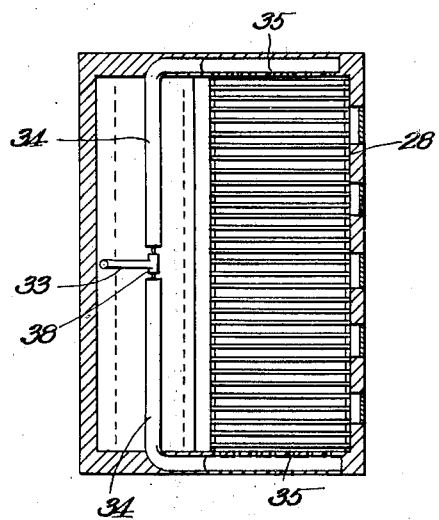
Figure 8 is a horizontal section through the furnace of Figure 7.

In Figures 7 and 8, the apparatus is shown as applied to a boiler furnace of well known type, in which 27 indicates the combustion chamber, 28 the grates, and 29 the vent or stack equipped with a control damper 30. 31 is a flue gas take-off conduit connected to the stack below its damper, and 32 is a fan or blower for withdrawing the gases from the stack and discharging them through a return duct 33 placed, by preference within the furnace to act as a heat exchanger, said duct discharging the products of combustion through branches 34 placed in the side walls of the furnace and having discharge openings 35 above the grate line. In this construction also the radiator 36 equipped with an air admission damper controlled port 37 may be used, and if the fan is of insufficient capacity to handle the volume, the duct 33 may be provided with the jet apparatus 38, described in connection with the kiln supra.

From the above description, it will be apparent that I have produced a process and apparatus which accomplishes all of the objects of the invention set forth as desirable; and it is to be understood that I reserve the right to all changes within the spirit of the invention and without the ambit of the prior art.

I claim:

1. The method of conserving fuel comprising the concentration of the flue gases into a single outlet passageway, the withdrawal from the outlet passageway of a portion of the flue gases, and the recirculation thereof through the combustion chamber.

2. The method of conserving fuel comprising the concentration of the flue gases into a single outlet passageway, the withdrawal from the outlet passageway of a portion of the flue gases, intermixing air with such flue gases, and the recirculation of the mixture through the combustion chamber.

3. The method of conserving fuel comprising the concentration of the flue gases into a single outlet passageway, the withdrawal from the outlet passageway of a portion of the flue gases, the reheating thereof, and the recirculation of the reheated gases through the combustion chamber.

4. The method of conserving fuel comprising the concentration of the flue gases into a single outlet passageway, the withdrawal from the outlet passageway of a portion of the flue gases, the intermixing of air with such flue gases, the heating of the mixture, and the recirculation of the heated mixture through the combustion chamber.

5. In fuel conservation apparatus for furnaces, the combination with a combustion chamber, of an outlet passageway in which the escaping flue gases are concentrated, a heat exchanger in said passageway, connections from the heat exchanger to the passageway and to the combustion chamber, and apparatus for withdrawing a part of the flue gases from the passageway and forcing them through the heat exchanger to the combustion chamber.

6. In fuel conservation apparatus for furnaces, the combination with a combustion chamber, of an outlet passageway in which the escaping flue gases are concentrated, a heat exchanger in said passageway, connections from the heat exchanger to the passageway and to the combustion chamber, a port for admitting air into the connection between the passageway and heat exchanger, and apparatus for withdrawing a part of the flue gases from the passageway, mixing it with air from said port, and forcing the mixture through the heat exchanger to the combustion chamber.

7. In fuel conservation apparatus for furnaces, the combination with a combustion chamber, of an outlet passageway in which escaping flue gases are concentrated, connections from the passageway to the combustion chamber, and apparatus for withdrawing a part of the flue gases from the passageway and forcing them through the connections to the combustion chamber.

8. In fuel conservation apparatus for furnaces, the combination with a combustion chamber, of an outlet passageway in which escaping flue gases are concentrated, a connection from the passageway to the combustion chamber, a port in said connection for admitting air, and apparatus for withdrawing a part of the flue gases from the passageway, mixing them with air from said port, and forcing the mixture through the connection to the combustion chamber.

9. In fuel conservation apparatus for furnaces, the combination with a combustion chamber, of an outlet passageway in which escaping flue gases are concentrated, a by-pass from the passageway to the combustion chamber, a radiator in the by-pass, and means for inducing a circulation of flue gases through said by-pass.

10. In fuel conservation apparatus for furnaces, the combination with a combustion chamber, of an outlet passageway in which escaping flue gases are concentrated, a conduit leading to the combustion chamber from the passageway, and a jet for withdrawing flue gases from the passageway and forcing them into the conduit.

11. In a kiln having a plurality of combustion chambers, an outlet passageway for discharging in a single volume the products of combustion of said chambers, a header having a discharge opening into each of said combustion chambers, a connection from the header to the passageway, and means for withdrawing flue gases from the passageway and discharging them through the connection.

12. The method of controlling combustion in furnaces by regulation of the vacuous condition therein which comprises restricting the outflow of flue gases, and the return to the combustion chamber of a volume of the flue gases.

13. The method of controlling combustion in furnaces by regulation of the vacuous condition therein which comprises restricting the outflow of flue gases, the withdrawal of a volume of flue gases from the furnace vent, the admixture of air therewith, and the return to the combustion chamber of such mixture.

CHESTER M. FRANCIS.